United States Patent [19]

Funk

[11] 4,058,910
[45] Nov. 22, 1977

[54] APPARATUS FOR TEACHING THE STRUCTURES AND PROJECTION OF ARTERIAL SYSTEMS

[75] Inventor: David C. Funk, Iowa City, Iowa

[73] Assignee: University of Iowa Research Foundation, Iowa City, Iowa

[21] Appl. No.: 743,202

[22] Filed: Nov. 18, 1976

[51] Int. Cl.² .............................................. G09B 23/28
[52] U.S. Cl. ........................................... 35/17; 35/53; 40/130 B
[58] Field of Search .................. 35/17, 20, 53, 58, 59; 40/130 B; 250/458

[56] References Cited
U.S. PATENT DOCUMENTS

| | | | |
|---|---|---|---|
| 1,951,422 | 3/1934 | Klemperer | 35/17 |
| 1,972,123 | 9/1934 | Zimmerman | 40/130 B |
| 2,016,151 | 10/1935 | Levene | 35/17 |
| 2,085,180 | 6/1937 | Bevis | 35/59 |
| 3,348,319 | 10/1967 | Harrison | 35/17 X |
| 3,802,096 | 4/1974 | Matern | 35/17 |

Primary Examiner—Harland S. Skogquist
Attorney, Agent, or Firm—Beveridge, DeGrandi, Kline & Lunsford

[57] ABSTRACT

A housing is provided with an observation opening which exposes a three dimensional model of an arterial system. When a rear-lighted projection screen is placed over the observation opening, light from a projector within the housing casts a shadow of the model on the screen to simulate the view seen in arteriography procedures.

10 Claims, 5 Drawing Figures

U.S. Patent  Nov. 22, 1977  Sheet 1 of 2  4,058,910
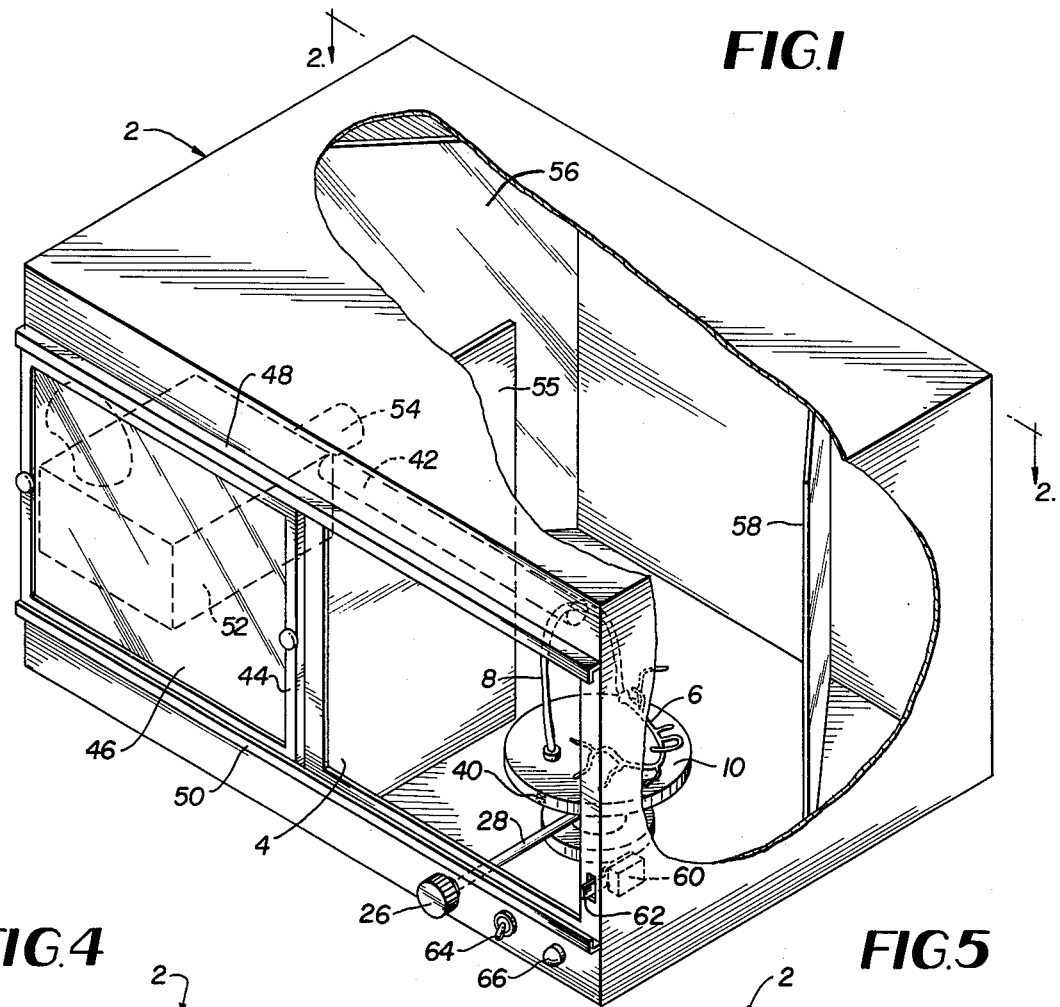
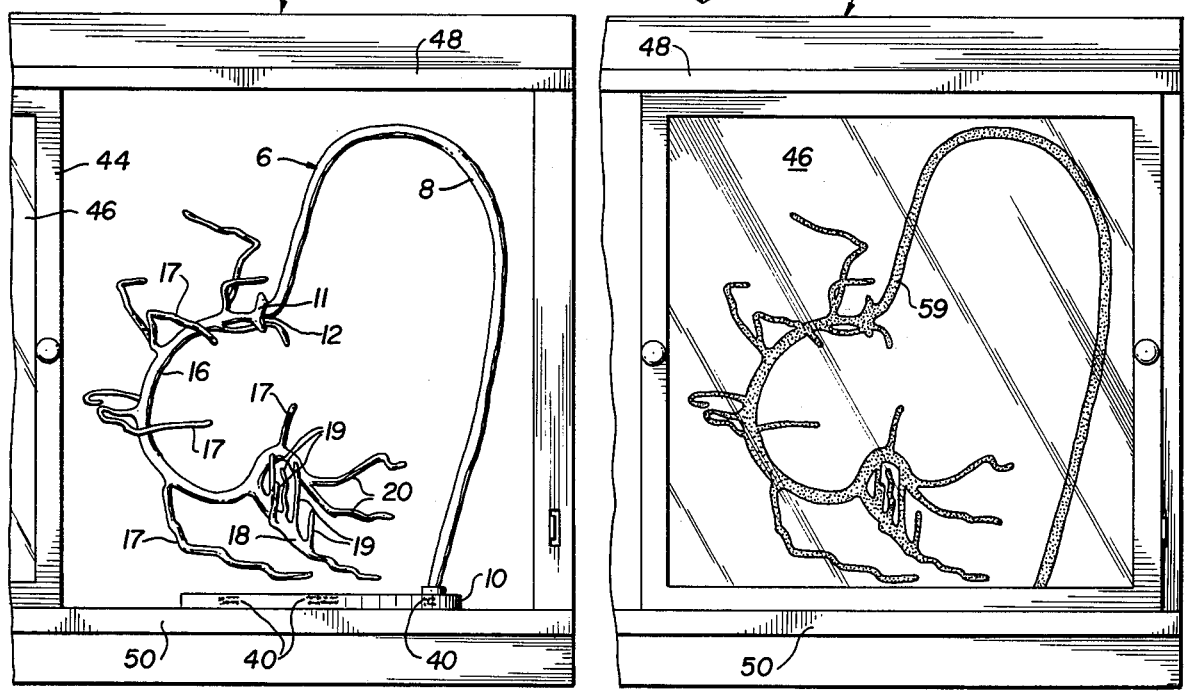

APPARATUS FOR TEACHING THE STRUCTURES AND PROJECTION OF ARTERIAL SYSTEMS

BACKGROUND AND SUMMARY OF THE INVENTION

This invention is directed to an apparatus for teaching and developing a familiarity with arterial systems and for teaching and developing the association between three dimensional arterial systems and their two dimensional projections as seen in radiographic studies, i.e. in coronary arteriograms.

Routine diagnostic coronary arteriograms are made by the technique of selectively catheterizing the ostium of the right or left coronary artery, injecting radiopaque contrast material, and photographing the dynamic, transient, opacification of each artery, employing image intensification and high speed cinefluorography. A video display device is used to monitor the coronary arteriograms as they are being made.

Presently, students are prepared for making and studying coronary arteriograms by familiarizing the students with locally prepared two dimensional diagrams and drawings, rather than with a display which provides immediate conversion between a three dimensional object and a two dimensional simulated radiographic view which resembles geometrically the coronary arteriograms and the video display image seen when making such arteriograms.

Simulated heart deformities have been displayed in the past by a Flurodemonstrator device which included unenclosed rotatable three dimensional solid models of hearts with stubs of great vessels attached en masse with models of the trachea, aorta, pulmonary arteries, esophagus, and spine incorporating as a radiopaque totality a model of the mediastinum and its contained organs and structures, as would present associated shadows on fluoroscopic examination of the heart. Fluorescent lights illuminated the model for three dimensional viewing, and a shadow of the model was automatically projected on a screen for simulated fluoroscopic two dimensional study. These devices, however, required a darkened room due to the unenclosed location of the model, and they were incapable of use in preparing students for radiographic studies of the arterial systems, as they did not include the arterial branches, and furthermore would cast a large block shadow rather than that of a branching arterial tree.

According to this invention, a three dimensional model of an arterial system is positioned in a housing which is substantially closed to exterior light except for minor ventilation openings if needed, and an observation opening through which the model is visible. A rear-lighted porjection screen is movable from an inoperative position removed from the observation opening to an operative position which lies across the observation opening. When the projection screen is in its operative position, a rear-lighting means in the housing is directed against the rear of the model to cast a shadow thereof on the projection screen.

BRIEF DESCRIPTION OF THE DRAWINGS

FIG. 1 is a broken perspective view of a preferred apparatus constructed according to the invention;

FIG. 4 is a view of a model seen in the apparatus in its front-lighted mode of operation; and FIG. 5 is a view of a model in the apparatus in its rear-lighted shadowgraph mode of operation.

DESCRIPTION OF A PREFERRED EMBODIMENT

Figure 2:
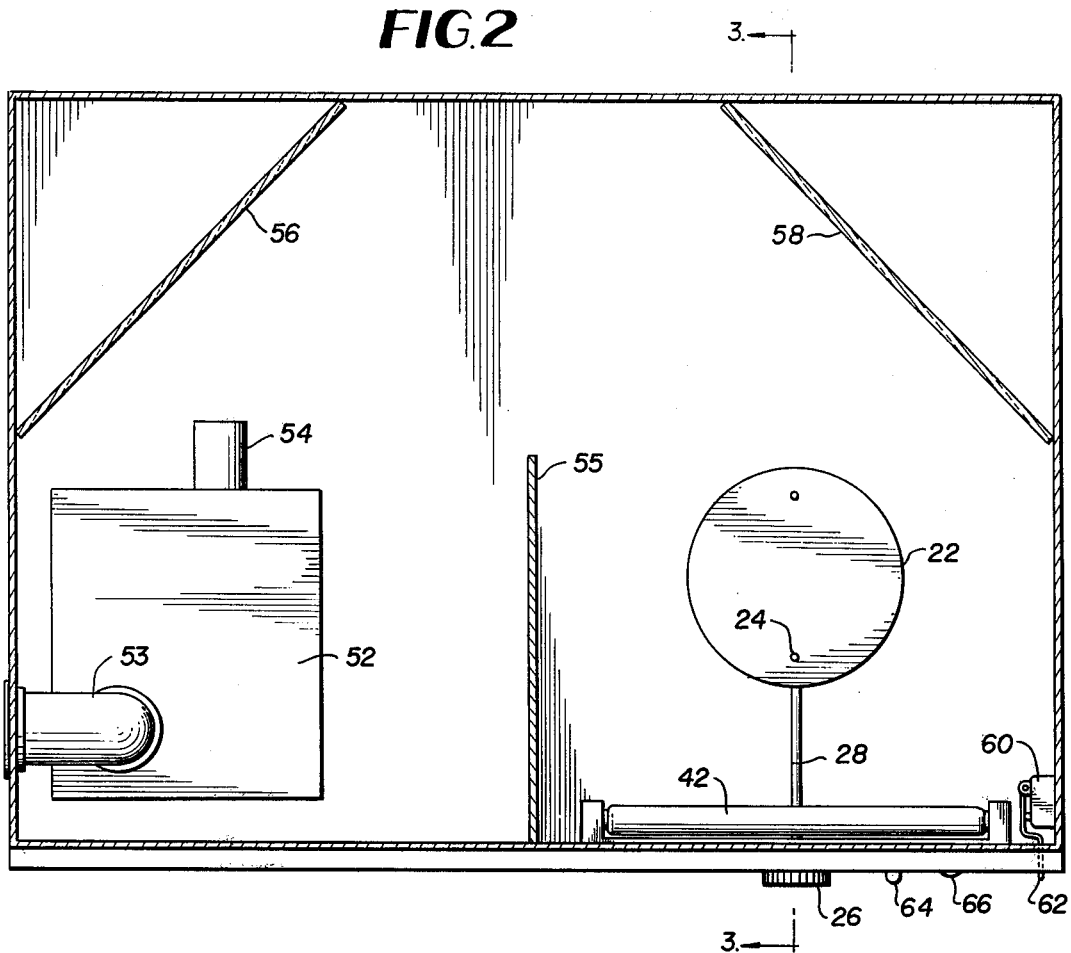
FIG. 2 is a plan view of the interior of the apparatus as seen along the line 2—2 in FIG. 1.

The apparatus of the invention is provided with a housing 2, having a blackened interior substantially closed to the admission of light except for ventilation and observation openings. The front wall of the housing has an observation opening 4 to enable a user to observe the three dimensional multi-colored model 6 which is at a position visible through the observation opening 4. The model 6 is supported on a discoid base 10 and is in the form of an arterial system such as the illustrated right coronary arterial tree, enlarged about three times to correspond to the degree of enlargement used in coronary arteriography.

In a common technique of coronary arteriography, catheters are routinely introduced through the groin and advanced in a headward direction to the ostium of the arterial tree being studied. The average disposition of such a catheter is represented in the model by the catheter-simulating support 8 which leads vertically upward from an outer portion of the discoid base 10, and arches over to the point 12 where it is connected to the model of the coronary artery. The coronary artery model 6 is suspended in an anatomically correct attitude, related as it would be to the catheter in the lumen of the aorta, the cather model 8, following its course in retrograde fashion sequentially upward from the level of the diaphragm, first in the descending thoracic aorta, then the aortic arch, then the ascending thoracic aorta and terminating with its tapered tip in the ostium of the coronary artery.

The three dimensional model 6 is provided with color coded fluorescent pigments which enable a viewer to identify the various branches by reference to a corresponding color coded chart. In one model constructed by the inventor, the catheter-simulating body 8 was colored blue, the ostiumsimulating body 11 is deep red; the coronary artery portion 16 and its branches 17 are light red; the posterior descending coronary artery 18 and its septal arteries 19 are orange; and the distal right with branches to the left ventricle 20 are colored green. The remaining branches are also given appropriate colors to facilitate identification.

Figure 3:
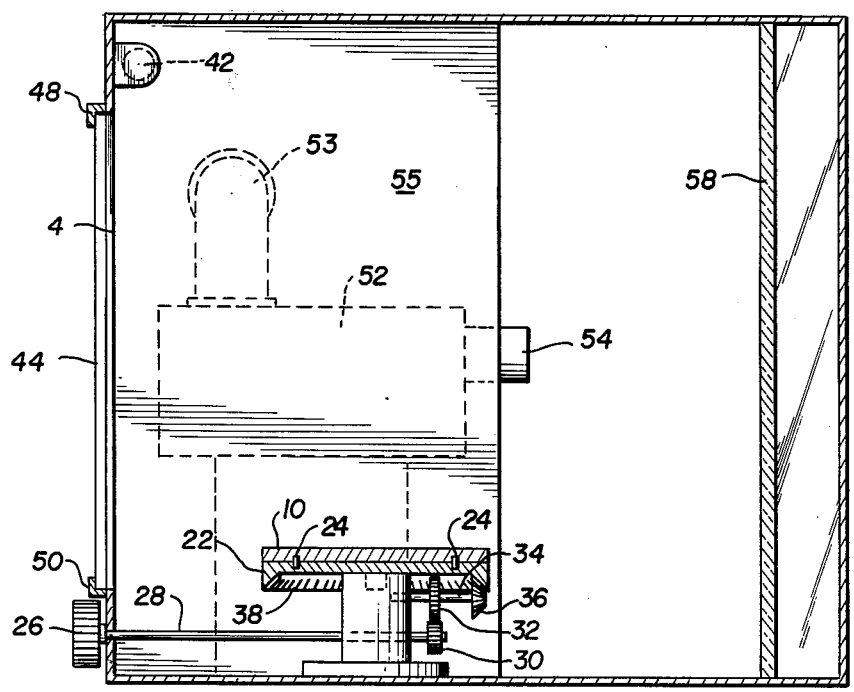
FIG. 3 is a sectional view taken along the lines 3—3 in FIG. 2.

The horizontal base 10 of the model is removably positioned on a turntable 22 seen in FIG. 3. The turntable 22 is provided with aligning pins 24 received in corresponding apertures in the disc base 10 of the model. The turntable 22 is rotatable about its central axis by means of a gear system actuated by a knob 26 which is exposed at the front of the device for manipulation by a user. The knob 26 is connected to a rotatable shaft 28 provided with a first pinion 30 which meshes with a second pinion 32 on shaft 34. A bevel gear 36 on shaft 34 drives the turntable which is provided with bevel teeth 38.

In the study of arterial models, it is quite important that the user learn the relationship between the angle of observation and the two dimensional view seen at such an angle. This angular identification is facilitated by providing the disc base 10 with markings 40 which represent the corresponding angle of an arteriogram. For example, in FIG. 4, the appropriate indicia would indicate the view to be of the right coronary artery, 30° left anterior oblique. It should be noted that the angles indicated by markings 40 do not correspond to the angular displacement of the disc, as the rotational axis of the disc base 10 is not coincident with the central long axis of the torso which is the frame of reference when making arteriograms. The degrees of rotation marked on the disc 10 are derived from the average projection of the average heart and the average thorax which, of course, does not correspond with the central axis of the disc and turntable.

When the window or observation opening 4 is in the position illustrated in FIG. 1, the user will study the three dimensional model 6 which, at that time, is preferably frontlighted by means of an ultraviolet light source 42 which excites and increases the visibility of the fluorescent pigments on the model 6. Using this front-lighted mode of operation, the user will become familiar with the three dimensional configuration of the corresponding arterial system of the human body.

In order to enable the user to become familiar with the two dimensional projection of the arterial system, corresponding geometrically to the view seen on the monitor of a video display when making anteriograms, there is provided a door 44 which carries a back-lighted projection screen 46. The door 44 is slidably movable in the tracks 48, 50 to and from a position where it overlies the observation opening 4. The screen 46 may be a sheet of acrylic plastic which has its rear surface coated with a material sold under the trademark Polascreen by Raven Screen Corporation, 124 East 124th Street, New York, New York. When the screen 46 covers the observation opening 4, the model 6 is illuminated from the rear by means of a projector 52 which has an exhaust duct 53 leading to the exterior of the housing 2. A suitable projector is a Sawyer 500 watt projector, normally sold for use in projecting 35 millimeter transparencies. As best seen in FIG. 2, the projector lens system 54 directs a modified * beam of light rearwardly in the housing 2 against a mirror 56 which reflects the light in a lateral direction behind the blackened opaque partition 55 to a second mirror 58 which reflects the light forwardly against the rear of the model 6 and onto the rear face of the screen 46. A shadow 59 of the model will be cast on the screen 46 to provide a two dimensional view such as the one illustrated in FIG. 5.

* As the light beam emerges from the final lens, it is constricted by a lens cap containing a one half inch diameter central perforation which sizes the cone of light to fit the rear projection screen.

During the back-lighted mode of operation illustrated by FIG. 5, the ultraviolet lamp 42 is deactivated. Similarly, during the front-lighted mode of operation shown in FIGS. 1 and 4, the light projector 52 is deactivated. Activation of the lamp 42 and projector 52 is achieved by means of a multiple contact switch 60 which has an actuating lever 62 located in the path of the sliding door 44 so that the switch is in its normal position shown in FIG. 4 until the door 44 is moved to its closed position to contact the actuating lever 62 as shown in FIG. 5. Such actuation of the switch 60 turns off the ultraviolet lamp 42 and turns on the projector 52. If desired, the switch 60 may operate at the opposite end of the travel of the door, the connection to the contacts being correspondingly changed so that the front-lighting means 42 is actuated when the door 44 is open, and the rear-lighting means 52 is actuated when the door is closed to provide a two dimensional presentation of the arterial model on screen 46.

The power supply system to the apparatus is controlled by a toggle switch 64 which, in its on position, also energizes the pilot lamp 66.

The artery model 6 may be constructed of various gauges of wire, coated by multiple layers of latex to produce the appropriate diameter of the various branches of the arterial system. The largest diameter wire is the 3/16 inch diameter copper wire used as the core of the catheter-simulating portion 8 of the model. The wires are soldered together, bent and molded to the correct shape of a three dimensional model of either the right or left coronary artery with its major and significant branches. The final coating layer is formed with a blend of a material sold under the trademark Liquitex, mixed 3:1 with fluorescent tempera paints which color code the branches to assist the neophyte in properly identifying them. The Liquitex material is available from Permanent Pigments Division, Norwood, Ohio.

Although a device made according to the invention may have varying dimensions, a suitable version thereof was produced with a housing 2 which is 35 inches long, 21 inches deep and 24 inches high. The observation window 4 was 16 inches long and 14 inches high, and the discoid bases 10 for the models had a 10 inch diameter and were coated with a black matte enamel.

In use, the appropriate model 6, usually of the left or right coronary artery, is positioned on the turntable 22 and indexed with respect thereto by the alignment pins 24. The user may study the three dimensional configuration of the arterial tree with the screen 46 located at its inoperative position to the left of the apparatus, the model 6 at this time being front-lighted by the untraviolet lamp 42. Identification of the various branches of the arterial tree may be facilitated by providing and referring to a table or chart which describes the color coding system.

The user is able to select the view he wishes to study by operating the knob 26 which rotates the turntable 22, disc 10 and model 6. Numbers indicating the degree of rotation are visible on the perimeter of the disc 10 so that the user may select the desired simulated projections such as 60° right anterior oblique, 30° left anterior oblique, etc.

After becoming familiar with the three dimensional model, the user manually moves the screen 46 to the right to a position where it overlies the window 4. At the rightmost point of travel of the screen, the switch 60 is operated by door 44 and actuator 62 to deactivate the ultraviolet frontlighting means 42 and to activate the projector 52 which is the rear-lighting means of the apparatus. Light from the projector strikes the rear of the model to cast a shadow of the model on the screen 46 as seen in FIG. 5 to provide a two dimensional view of the arterial tree, closely resembling the view seen on the video monitor during actual filming of coronary arteriograms.

The user may, while leaving the screen 46 closed and observing the resultant shadowgraph, operate the knob 26 to rotate the turntable 22 and model 6 causing the shadows of the various arteries to change with respect to each other. This enables the user to observe the changing relationship between the shadows of the arteries in the arterial tree. As necessary, the screen 46 may be removed, causing the switch 60 to deactivate the rear lighting means 52 and to activate the ultraviolet front lighting means 42. This presents the view of FIG. 4 and permits a review or confirmation of the three dimensional relationships between the arteries.

Throughout these activities, the individual user has complete freedom in selecting the view and type of illumination and display of the model 6. This is done without darkening the entire room, enabling the user to refer to notes, pictures, charts and other ancillary reference materials. Moreover, several students can operate different machines simultaneously in the same room, starting and stopping on separate schedules, without coordinating their blackout times as was necessary with the prior Fluordemonstrator devices.

It will be apparent to those skilled in the art that the invention may take many embodiments other than the preferred embodiment disclosed above. For example, the observation opening may also have a removable transparent window, the front lighting may be omitted from the housing or provided by conventional incandescent or fluorescent lamps, and other paths may be provided for the rear-lighting beam of light. The invention, therefore is not to be construed as encompassing only the disclosed embodiment, but includes a wide variety of structures within the spirit of the claims which follow.

I claim:

1. Apparatus for teaching the structures and projections of arterial system in preparation for making and studying arteriograms, said apparatus comprising,
    a substantially closed housing having an observation opening,
    a three dimensional model of an arterial system located in said housing at a position which is visible through said observation opening,
    a rear-lighted projection screen movable from an inoperative position removed from said observation opening to an operative position which lies across said observation opening,
    rear-lighting means in said housing for directing a beam of light first against said model and then against said projection screen when said projection screen is in its operative position, to cast a two dimensional shadow of said model on said projection screen,
    means for actuating said rear-lighting means when said projection screen is in its operative position, and for deactivating said rear-lighting means when said projection screen is in its inoperative position to permit direct observation of the three dimensional model.

2. The apparatus of claim 1 having linear guide means for supporting said projection screen for sliding movement between its operative and inoperative positions, and electrical switch means operated by such movement to activate and deactivate said rear lighting means.

3. The apparatus of claim 1 wherein said model is a model of one of the coronary arterial trees.

4. The apparatus of claim 3 having a horizontal rotatable platform supporting said model, means on said platform for indicating, at a given angular orientation of the model, the angular orientation of an arteriograms which corresponds to the view provided by the model at said given angular orientation of the model.

5. The apparatus of claim 3 having a catheter-simulating element which first extends upwardly and then descends to connect with and support the model of the arterial system at a location located centrally of said observation opening.

6. The apparatus of claim 3 wherein the model is provided with branches of different colors to facilitate their identification by reference to a corresponding color coded chart.

7. The apparatus of claim 6 having an ultraviolet light source for illuminating surfaces of the model which are visible through said observation opening, said model having said different colors provided by pigments which fluoresce under ultraviolet light.

8. The apparatus of claim 1 having at least one mirror in said housing in the optical path between said illumination means and said projection screen.

9. The apparatus of claim 8 wherein there are two said mirrors, said mirrors being front-silvered mirrors.

10. The apparatus of claim 8 wherein said illumination means has a lens for directing the beam of light rearwardly in said housing, a first said mirror reflecting said beam of light laterally in said housing, and a second said mirror reflecting said laterally-reflected beam forwardly against said projection screen.

* * * * *